(12) United States Patent
Versteeg et al.

(10) Patent No.: US 8,099,756 B2
(45) Date of Patent: Jan. 17, 2012

(54) CHANNEL CHANGES BETWEEN SERVICES WITH DIFFERING BANDWIDTH IN A SWITCHED DIGITAL VIDEO SYSTEM

(76) Inventors: William C. Versteeg, Alpharetta, GA (US); William E. Wall, Atlanta, GA (US); Luis A. Rovira, Atlanta, GA (US); Don Michael Zauzig, Lawrenceville, GA (US)

( * ) Notice: Subject to any disclaimer, the term of this patent is extended or adjusted under 35 U.S.C. 154(b) by 660 days.

(21) Appl. No.: 11/164,110

(22) Filed: Nov. 10, 2005

(65) Prior Publication Data
US 2007/0107023 A1 May 10, 2007

(51) Int. Cl.
*H04N 7/173* (2011.01)

(52) U.S. Cl. ......... 725/95; 725/96; 725/93; 725/91; 725/98; 725/114; 725/115; 725/116; 725/117; 725/118; 709/220; 709/230; 455/427; 455/445; 455/12.1; 370/352; 370/328

(58) Field of Classification Search .......... None
See application file for complete search history.

(56) References Cited

U.S. PATENT DOCUMENTS

| | | | |
|---|---|---|---|
| 5,572,347 A | 11/1996 | Burton et al. ......... 359/124 |
| 5,594,509 A | 1/1997 | Florin et al. |
| 5,600,663 A | 2/1997 | Ayanouglu et al. ......... 371/41 |
| 5,633,683 A | 5/1997 | Rosengren et al. |
| 5,687,167 A | 11/1997 | Bertin et al. ......... 370/254 |
| 5,699,365 A | 12/1997 | Klayman et al. ......... 371/55 |
| 5,699,369 A | 12/1997 | Guha ......... 371/41 |
| 5,790,546 A | 8/1998 | Dobbins et al. |
| 5,793,436 A | 8/1998 | Kim ......... 348/497 |
| 5,808,662 A | 9/1998 | Kinney et al. ......... 348/15 |
| 5,815,145 A | 9/1998 | Matthews ......... 345/327 |
| 5,870,087 A | 2/1999 | Chau ......... 715/202 |
| 5,913,031 A | 6/1999 | Blanchard |
| 5,949,795 A | 9/1999 | Moroney et al. |
| 6,016,166 A | 1/2000 | Huang et al. ......... 348/515 |
| 6,101,221 A | 8/2000 | Varanasi et al. ......... 375/240 |
| 6,118,498 A | 9/2000 | Reitmeier |
| 6,119,092 A | 9/2000 | Patwardhan et al. ......... 704/503 |
| 6,173,115 B1 | 1/2001 | Willis ......... 386/125 |
| 6,252,849 B1 | 6/2001 | Rom et al. |

(Continued)

FOREIGN PATENT DOCUMENTS
EP 0 714 192 5/1996

(Continued)

OTHER PUBLICATIONS

U.S. Appl. No. 10/080,380, filed Feb. 21, 2002, Entitled "Systems and Methods for Generating a Real-Time Video Program Guide Through Video Access of Multiple Channels," Inventor: Peter Chan.

(Continued)

*Primary Examiner* — Joseph P Hirl
*Assistant Examiner* — Fred Peng
(74) *Attorney, Agent, or Firm* — Merchant & Gould

(57) ABSTRACT

Channel changes between services with differing bandwidth in a switched digital video system. A services map published by the headend and distributed to all of the edge devices, allows a bandwidth requirement to be correlated with each request from a device in the home. The bandwidth requirement is passed upstream along with the request for service and is subject to a system resource management validation.

18 Claims, 9 Drawing Sheets

U.S. PATENT DOCUMENTS

| | | | |
|---|---|---|---|
| 6,278,716 B1 | 8/2001 | Rubenstein et al. | 370/432 |
| 6,307,839 B1 | 10/2001 | Gerszberg et al. | 370/235 |
| 6,310,918 B1 | 10/2001 | Saha et al. | 375/240.16 |
| 6,453,471 B1 | 9/2002 | Klosterman | |
| 6,480,541 B1 | 11/2002 | Girod et al. | 375/240.12 |
| 6,510,553 B1 | 1/2003 | Hazra | 725/87 |
| 6,538,992 B1 | 3/2003 | Subbiah et al. | 370/230 |
| 6,594,798 B1 | 7/2003 | Chou et al. | 370/389 |
| 6,628,301 B1 | 9/2003 | Acton et al. | 345/716 |
| 6,665,751 B1 | 12/2003 | Chen et al. | 710/52 |
| 6,678,332 B1 | 1/2004 | Gardere et al. | 375/240.26 |
| 6,701,528 B1 | 3/2004 | Arsenault et al. | 725/89 |
| 6,763,019 B2 | 7/2004 | Mehta et al. | 725/88 |
| 6,792,047 B1 | 9/2004 | Bixby et al. | 375/240.26 |
| 6,871,006 B1 | 3/2005 | Oguz et al. | 386/68 |
| 6,973,667 B2 | 12/2005 | Fritsch | 725/88 |
| 7,017,102 B1 | 3/2006 | Kristensson et al. | 714/786 |
| 7,054,643 B2 | 5/2006 | Trossen et al. | 455/454 |
| 7,065,779 B1 | 6/2006 | Crocker et al. | |
| 7,073,117 B1 | 7/2006 | Ireland et al. | 714/786 |
| 7,096,481 B1 | 8/2006 | Forecast et al. | 725/32 |
| 7,113,484 B1 | 9/2006 | Chapman et al. | |
| 7,114,172 B2 | 9/2006 | Lord | 725/80 |
| 7,228,356 B2 | 6/2007 | Nguyen et al. | 709/231 |
| 7,266,127 B2 | 9/2007 | Gupta et al. | 370/413 |
| 7,281,058 B1 | 10/2007 | Shepherd et al. | 709/238 |
| 7,412,149 B2 | 8/2008 | Cohen et al. | 386/68 |
| 7,433,946 B2 | 10/2008 | Shen et al. | |
| 7,447,978 B2 | 11/2008 | Hannuksela | 714/776 |
| 7,477,653 B2 | 1/2009 | Smith et al. | 370/432 |
| 7,490,344 B2 | 2/2009 | Haberman et al. | 370/432 |
| 7,584,404 B2 | 9/2009 | Kozintsev et al. | 714/776 |
| 7,610,606 B2 * | 10/2009 | Carlucci et al. | 725/95 |
| 7,620,294 B2 | 11/2009 | Green et al. | 725/98 |
| 7,627,886 B2 | 12/2009 | Barbanson et al. | 725/90 |
| 7,725,797 B2 | 5/2010 | Ver Steeg | 714/751 |
| 7,729,590 B2 | 6/2010 | Kosugi | 386/68 |
| 7,742,407 B2 | 6/2010 | Versteeg et al. | 370/230 |
| 7,761,902 B2 | 7/2010 | Liu et al. | 725/92 |
| 7,774,672 B2 | 8/2010 | Ver Steeg et al. | 714/751 |
| 7,849,490 B2 | 12/2010 | Akhter | 725/120 |
| 7,870,465 B2 | 1/2011 | VerSteeg | 714/774 |
| 7,873,760 B2 | 1/2011 | Versteeg | 710/52 |
| 7,877,660 B2 | 1/2011 | VerSteeg | 714/751 |
| 7,899,046 B2 | 3/2011 | Ver Steeg | 370/389 |
| 2001/0025378 A1 | 9/2001 | Sakamoto et al. | |
| 2002/0019853 A1 | 2/2002 | Vange et al. | |
| 2002/0056107 A1 | 5/2002 | Schlack et al. | 725/35 |
| 2002/0057367 A1 | 5/2002 | Baldock | 348/554 |
| 2002/0067909 A1 | 6/2002 | Iivonen | 386/88 |
| 2002/0112244 A1 | 8/2002 | Liou et al. | 725/93 |
| 2002/0129129 A1 * | 9/2002 | Bloch et al. | 709/220 |
| 2002/0181454 A1 | 12/2002 | Norman et al. | |
| 2002/0184637 A1 | 12/2002 | Perlman | 725/87 |
| 2002/0199203 A1 | 12/2002 | Duffy et al. | |
| 2003/0002849 A1 | 1/2003 | Lord | 386/46 |
| 2003/0007212 A1 | 1/2003 | Sala et al. | 398/72 |
| 2003/0007507 A1 | 1/2003 | Rajwan et al. | 370/468 |
| 2003/0007508 A1 | 1/2003 | Sala et al. | 370/468 |
| 2003/0007724 A1 | 1/2003 | Gummalla et al. | 385/24 |
| 2003/0014752 A1 | 1/2003 | Zaslavsky et al. | 725/40 |
| 2003/0048808 A1 | 3/2003 | Stahl et al. | 370/487 |
| 2003/0133458 A1 | 7/2003 | Sato et al. | 370/395 |
| 2003/0149975 A1 | 8/2003 | Eldering et al. | 725/34 |
| 2003/0156218 A1 | 8/2003 | Laksono | 709/231 |
| 2003/0159143 A1 | 8/2003 | Chan | 725/41 |
| 2003/0188253 A1 | 10/2003 | Kauschke et al. | 714/755 |
| 2003/0188311 A1 | 10/2003 | Yuen et al. | 725/42 |
| 2003/0196211 A1 | 10/2003 | Chan | 725/131 |
| 2003/0200551 A1 | 10/2003 | Kang | 725/120 |
| 2003/0217365 A1 | 11/2003 | Caputo | 725/95 |
| 2004/0111470 A1 | 6/2004 | Poulsen et al. | 709/204 |
| 2004/0133907 A1 | 7/2004 | Rodriguez et al. | |
| 2004/0184776 A1 | 9/2004 | Inoue et al. | 386/83 |
| 2004/0194147 A1 | 9/2004 | Craven et al. | 725/111 |
| 2004/0204945 A1 | 10/2004 | Okuda et al. | 704/500 |
| 2004/0225877 A1 | 11/2004 | Huang | 713/100 |
| 2004/0226044 A1 * | 11/2004 | Goode | 725/95 |
| 2004/0228277 A1 | 11/2004 | Williams | |
| 2004/0260814 A1 * | 12/2004 | Budge et al. | 709/227 |
| 2005/0155075 A1 | 7/2005 | Crichton | 725/105 |
| 2005/0166242 A1 | 7/2005 | Matsumoto et al. | 725/88 |
| 2005/0172326 A1 | 8/2005 | Jerding et al. | 725/116 |
| 2005/0190781 A1 | 9/2005 | Green et al. | |
| 2005/0204251 A1 | 9/2005 | Moon et al. | 714/748 |
| 2005/0228892 A1 | 10/2005 | Riley et al. | 709/228 |
| 2005/0289618 A1 * | 12/2005 | Hardin | 725/95 |
| 2005/0289623 A1 | 12/2005 | Midani et al. | 725/100 |
| 2006/0013247 A1 | 1/2006 | Kotch et al. | 370/437 |
| 2006/0025149 A1 | 2/2006 | Karaoguz et al. | 455/452.2 |
| 2006/0074968 A1 | 4/2006 | Gyetko | 707/102 |
| 2006/0080707 A1 | 4/2006 | Laksono | 725/38 |
| 2006/0112325 A1 | 5/2006 | Ducheneaut et al. | 715/500.1 |
| 2006/0212917 A1 | 9/2006 | Boucher et al. | 725/105 |
| 2006/0236358 A1 | 10/2006 | Liu et al. | 725/117 |
| 2006/0242240 A1 | 10/2006 | Parker et al. | |
| 2007/0002789 A1 | 1/2007 | Zhang | 370/328 |
| 2007/0044130 A1 | 2/2007 | Skoog | 725/110 |
| 2007/0098015 A1 | 5/2007 | Eijsberg | 370/468 |
| 2007/0104226 A1 | 5/2007 | Ver Steeg et al. | 370/485 |
| 2007/0106782 A1 | 5/2007 | Ver Steeg et al. | 709/224 |
| 2007/0107024 A1 | 5/2007 | Ver Steeg et al. | 725/95 |
| 2007/0130393 A1 | 6/2007 | Ver Steeg | 710/57 |
| 2007/0169158 A1 | 7/2007 | Folgner et al. | 725/90 |
| 2007/0186228 A1 | 8/2007 | Ramaswamy et al. | 725/14 |
| 2007/0192812 A1 | 8/2007 | Pickens et al. | 725/94 |
| 2007/0220577 A1 | 9/2007 | Kongalath | 725/131 |
| 2007/0261087 A1 * | 11/2007 | Denney et al. | 725/95 |
| 2008/0008167 A1 | 1/2008 | Ver Steeg | 370/389 |
| 2008/0022190 A1 | 1/2008 | Ver Steeg | 714/776 |
| 2008/0022320 A1 | 1/2008 | Ver Steeg | 725/78 |
| 2008/0028279 A1 | 1/2008 | Ver Steeg | 714/776 |
| 2008/0028280 A1 | 1/2008 | Ver Steeg | 714/776 |
| 2008/0040767 A1 | 2/2008 | McCarthy et al. | 725/132 |
| 2008/0109692 A1 | 5/2008 | Ver Steeg | 714/746 |
| 2008/0134005 A1 | 6/2008 | Izzat et al. | 714/774 |
| 2008/0192820 A1 | 8/2008 | Brooks et al. | 375/240.02 |
| 2008/0229379 A1 | 9/2008 | Akhter | 725/139 |
| 2008/0244667 A1 | 10/2008 | Osborne | 725/94 |
| 2008/0244679 A1 | 10/2008 | Sukumar et al. | 725/121 |
| 2009/0007199 A1 * | 1/2009 | La Joie | 725/95 |
| 2009/0031342 A1 | 1/2009 | Ver Steeg et al. | 725/38 |
| 2009/0031392 A1 | 1/2009 | Ver Steeg et al. | 725/151 |
| 2009/0222875 A1 | 9/2009 | Cheng et al. | 725/147 |
| 2010/0046634 A1 | 2/2010 | Dai et al. | 375/240.25 |

FOREIGN PATENT DOCUMENTS

| | | |
|---|---|---|
| EP | 1294193 | 3/2003 |
| WO | WO 99/09741 | 2/1999 |
| WO | WO 01/69831 | 9/2001 |
| WO | WO 2005/020556 | 3/2005 |
| WO | WO 2006/019505 | 2/2006 |
| WO | WO 2006/061765 | 6/2006 |
| WO | WO 2007/111693 | 10/2007 |
| WO | WO 2007/111695 | 10/2007 |
| WO | WO 2007/111697 | 10/2007 |
| WO | WO 2007/120260 | 10/2007 |
| WO | WO 2007/120261 | 10/2007 |
| WO | WO 2008/006011 | 1/2008 |
| WO | WO 2008/006012 | 1/2008 |
| WO | WO 2008/006013 | 1/2008 |
| WO | WO 2008/006014 | 1/2008 |
| WO | WO 2008/048828 | 4/2008 |
| WO | WO 2008/118678 | 10/2008 |
| WO | WO 2008/121545 | 10/2008 |
| WO | WO 2009/018042 | 2/2009 |
| WO | WO 2009/018043 | 2/2009 |

OTHER PUBLICATIONS

U.S. Appl. No. 10/119,700, filed Apr. 10, 2002, Entitled "Systems, Methods and Apparatuses for Simulated Rapid Tuning of Digital Video Channels," Inventor: Peter Chan.

U.S. Appl. No. 11/164,102, filed Nov. 10, 2005, entitled "Quality of Service Management in a Switched Digital Video Environment," Inventor(s): William C. VerSteeg, et al.

U.S. Official Action dated Jun. 22, 2010 in U.S. Appl. No. 11/164,119.
U.S. Official Action dated Jun. 23, 2010 in U.S. Appl. No. 11/691,565.
Office Action for EP 07 812 632.3 dated Apr. 19, 2010.
U.S. Appl. No. 11/164,115, filed Nov. 10, 2005, Entitled "Atomic Channel Changes in a Switched Digital Video System," Inventors: William C. VerSteeg, et. al.
U.S. Appl. No. 11/164,119, filed Nov. 10, 2005, Entitled "Bandwidth Mangement in Each Network Device in a Switched Digital Video Environment," Inventors: William C. VerSteeg, et. al.
U.S. Appl. No. 11/164,147, filed Nov. 11, 2005, Entitled "Expedited Digital Signal Decoding," Inventor: William C. VerSteeg.
U.S. Appl. No. 11/428,336, filed Jun. 30, 2006, Entitled "Systems and Methods of Synchronizing Media Streams," Inventor: William C. VerSteeg.
U.S. Appl. No. 11/691,565, filed Mar. 27, 2007, entitled "Bandwidth Sensitive Switched Digital Video Content Delivery," Inventor: Jason C. Osborne.
U.S. Appl. No. 11/692,457, filed Mar. 28, 2007, entitled "Switched Digital Video Client Reverse Channel Traffic Reduction," Inventor(s): Kanthimathi Gayatri Sukumar, et al.
U.S. Appl. No. 11/550,441, filed Oct. 18, 2006, Entitled "Reducing Channel Change Time," Inventor: William C. VerSteeg.
U.S. Appl. No. 11/829,255, filed Jul. 27, 2007, Entitled "Systems and Methods of Differentiated Channel Change Behavior," Inventors: William C. VerSteeg, et al.
U.S. Appl. No. 11/829,274, filed Jul. 27, 2007, Entitled "Systems and Methods of Differentiated Requests for Network Access," Inventors: William C. VerSteeg et. al.
Sherer, et al. "Appendix A Low Bandwidth Low Latency Channel Change," U.S. Appl. No. 60/719,146, filed Sep. 21, 2005.
European Patent Application, EP 1 335 521, Oct. 24, 2002.
European Patent Application, EP 1 589 706, Apr. 19, 2004.
European Patent Application, EP 1 684 450, Oct. 26, 2004.
U.S. Official Action dated Mar. 5, 2007 in U.S. Appl. No. 10/080,380.
U.S. Official Action dated Sep. 19, 2007 in U.S. Appl. No. 10/080,380.
U.S. Official Action dated Dec. 14, 2007 in U.S. Appl. No. 10/119,700.
U.S. Official Action dated Feb. 22, 2008 in U.S. Appl. No. 11/164,147.
U.S. Official Action dated Apr. 8, 2008 in U.S. Appl. No. 10/080,380.
U.S. Official Action dated Jul. 1, 2008 in U.S. Appl. No. 10/119,700.
U.S. Official Action dated Aug. 21, 2008 in U.S. Appl. No. 11/428,336.
U.S. Official Action dated Sep. 3, 2008 in U.S. Appl. No. 11/164,115.
U.S. Official Action dated Sep. 19, 2008 in U.S. Appl. No. 11/164,102.
U.S. Official Action dated Sep. 26, 2008 in U.S. Appl. No. 11/164,147.
U.S. Official Action dated Nov. 17, 2008 in U.S. Appl. No. 10/119,700.
U.S. Official Action dated Dec. 1, 2008 in U.S. Appl. No. 10/080,380.
U.S. Official Action dated Jan. 9, 2009 in U.S. Appl. No. 11/164,119.
U.S. Official Action dated Feb. 2, 2009 in U.S. Appl. No. 11/482,439.
U.S. Official Action dated Feb. 12, 2009 in U.S. Appl. No. 11/428,336.
U.S. Official Action dated Feb. 19, 2009 in U.S. Appl. No. 11/164,115.
U.S. Official Action dated Mar. 18, 2009 in U.S. Appl. No. 11/164,147.
U.S. Official Action dated Mar. 24, 2009 in U.S. Appl. No. 11/164,102.
U.S. Official Action dated Apr. 29, 2009 in U.S. Appl. No. 11/692,457.
U.S. Official Action dated Apr. 30, 2009 in U.S. Appl. No. 10/119,700.
U.S. Official Action dated Jun. 23, 2009 in U.S. Appl. No. 11/428,336.
U.S. Official Action dated Jun. 23, 2009 in U.S. Appl. No. 11/691,565.
U.S. Official Action dated Jul. 17, 2009 in U.S. Appl. No. 11/164,119.
U.S. Official Action dated Jul. 27, 2009 in U.S. Appl. No. 11/164,147.
U.S. Official Action dated Jul. 31, 2009 in U.S. Appl. No. 11/482,439.
U.S. Official Action dated Aug. 5, 2009 in U.S. Appl. No. 11/164,115.
U.S. Official Action dated Aug. 18, 2009 in U.S. Appl. No. 11/164,102.
U.S. Official Action dated Sep. 11, 2009 in U.S. Appl. No. 11/482,437.
U.S. Official Action dated Sep. 18, 2009 in U.S. Appl. No. 11/482,436.
U.S. Official Action dated Sep. 18, 2009 in U.S. Appl. No. 11/482,438.
U.S. Official Action dated Oct. 20, 2009 in U.S. Appl. No. 11/692,457.
U.S. Official Action dated Nov. 23, 2009 in U.S. Appl. No. 11/164,115.
U.S. Official Action dated Nov. 24, 2009 in U.S. Appl. No. 10/119,700.
International Search Report dated Oct. 29, 2007, PCT/US2006/060713.
International Search Report dated Dec. 10, 2007, PCT/US2007/072825.
International Search Report dated Dec. 20, 2007, PCT/US2006/060703.
International Search Report dated Dec. 20, 2007, PCT/US2006/060709.
International Search Report dated Jan. 11, 2008, PCT/US2007/072819.
International Search Report dated Feb. 15, 2008, PCT/US2007/072820.
International Search Report dated May 6, 2008, PCT/US2007/072822.
International Search Report dated May 23, 2008, PCT/US2007/080869.
International Search Report dated Jul. 10, 2008, PCT/US08/070851.
International Search Report dated Jul. 10, 2008, PCT/US08/070853.
International Search Report dated Jul. 15, 2008, PCT/US2006/060695.
International Search Report dated Jan. 16, 2008, PCT/US2006/060700.
International Search Report dated Sep. 22, 2008, PCT/US2008/057296.
International Search Report dated Nov. 12, 2008, PCT/US2008/057297.
Written Opinion dated Oct. 29, 2007, PCT/US2006/060713.
Written Opinion dated Dec. 20, 2007, PCT/US2006/060703.
Written Opinion dated Dec. 20, 2007, PCT/US2006/060709.
Written Opinion dated Jan. 16, 2008, PCT/US2006/060700.
Written Opinion dated Feb. 15, 2008, PCT/US2007/072820.
Written Opinion dated May 22, 2008, PCT/US2006/060703.
Written Opinion dated Jul. 10, 2008, PCT/US2008/070851.
Written Opinion dated Jul. 15, 2008, PCT/US2006/060695.
Written Opinion dated Sep. 22, 2008, PCT/US2008/057296.
Written Opinion dated Nov. 12, 2008, PCT/US2008/057297.
Written Opinion dated Apr. 30, 2009, PCT/US2007/080869.
Office Action for EP 06 850 729.2 dated Jan. 27, 2009.
Office Action for EP 07 840 350.8 dated Apr. 28, 2009.
Office Action for EP 07 812 635.6 dated May 6, 2009.
Office Action for EP 06 850 128.7 dated Jul. 17, 2009.
Office Action for EP 07 812 631.5 dated Oct. 2, 2009.
Office Action for EP 07 812 632.3 dated Oct. 23, 2009.
"Digital Video Broadcasting (DVB); DVB-H Implementation Guidelines European Broadcasting Union, Union Europeenne de Radio-Television EBUUER; ETSI TR 102 377" ETSI Standards, Lis, vol. BC, No. V1.2.1, Nov. 1, 2005, XP014032216, ISSN: 0000-0001, pp. 27, 59.
Bormans J. et al., "Video coding with H.264/AVC: tools, performance, and complexity" IEEE Circuits and Systems Magazine, IEEE Service Center, New York, NY, US, vol. 4, No. 1, Jan. 1, 2004, pp. 7-28, XP011111220, ISSN: 1531-636X.
Shoaf et al. "IGMP Capabilities in Broadband Network Architercures", Whitepaper Juniper Networks, Mar. 1, 2005, pp. 1-25, XP002999116, pp. 1-31.

Cain et al.: "Internet Group Management Protocol, Version 3; rfc3376.txt" IETF Standard, Internet Engineering Task Force, IETF, CH, Oct. 1, 2002, XP015009135, ISSN: 000-0003, pp. 1-47.
Jean-Louis Gauvreau, et al.: Optimal Coding Rate of Punctured Convolutional Codes in Multiservice Wireless Cellular Systems: IEEE Transactions on Vehicular Technology, IEEE Service Center, Piscataway, NJ, vol. 48, No. 1, Jan. 1999, XP011063794, p. 117.
De M Cordeiro C. et al., "Establishing a Trade-off Between Unicast and Multicast Retransmission Modes for Reliable Multicast Protocols." Modeling Analysis and Simulation of Computer and Telecommunication Systems, Aug. 29, 2000, pp. 85-91, XP010515402.
Gemmell, Jim. "Scalable Reliable Multicast Using Erasure-Correcting Re-sends." Microsoft Research, Technical Report MSR-TR-97-20, [Online] Jun. 30, 1997, pp. 1-15, XP002461839.
Lee, Min Jeong et al. "Peformance Improvements of Wireless IP Multicast Conference System based on Designated Receivers," IEEE International Conference on Atlanta, GA, USA, vol. 2, Jun. 7, 1998-Jun. 11, 1998, pp. 807-811, XP010284688.
Nonnemacher, J. et al. "Parity-Based Loss Recovery for Reliable Multicast Transmission." IEEE/ACM Transactions on Networking, vol. 6, No. 4, Aug. 1998, pp. 349-361, XP000771969.
Paul, Sanjoy et al. "Reliable Multicast Transport Protocol (RMTP)" IEEE Journal on Selected Areas in Communications, vol. 15, No. 3, Apr. 1997, XP011054624.
Rizzo, Luigi et al. "RMDP: An FEC-based Reliable Multicast Protocol for Wireless Environments." Mobile Computing and Communications Review, vol. 2, No. 2, Apr. 1998, pp. 23-31, XP000738504.
Kemdore, R.G. "Scoped Hybrid Automatic Repeat reQuest with Forward Error Correction (SHARQFEC)." Computer Communication Review, ACM, New York, NY, vol. 28, No. 4, Oct. 1998, pp. 278-289, XP000914442.
Lacher, M.S., et al. "Performance Comparison of Centralized Versus Distributed Error Recovery for Reliable Multicast." IEEE/ACM Transactions on Networking, IEEE/ACM, New York, NY, vol. 8, No. 2, Apr. 2000, XP011038850.
Liu Wenjie et al.: "Prioritized admission strategy in a clustered video-on-demand system", IEEE Tencon' 02. 2002 IEEE Region 10 Conference on Computers, Communications, Control and Power Engineering Proceedings. Beijing, China, Oct. 28-31, 2002; New York, NY, vol. 1, Oct. 28, 2002, pp. 306-309, XP010628485, ISBN: 978-0-7803-7490-4.
Fitzek et al., "Error Control Teqhniques for Efficient Multicast Streaming in UMTS Networks"; Proceeding of Systemics, Cybernetics and Informatics SCI 2003 [Online] 2003, XP002477506 Orlando, Florida USA. Retrieved from the Internet URL:http//kom.aau.dk/ {ff/documents/SCI_2003.pdf> [retrieved on Apr. 21, 2008] pp. 4-5, figure 4.
Rummler et al., "Performance of Parity-Based Loss Recovery for Reliable Multicast in Third-General Mobile Networks"; Personal, Indoor and Mobile Radio Communications, 2005. PIMRC 2005. IEEE 16th International Symposium on Berlin, Germancy Sep. 11-14, 2005, Piscataway, NJ, USA, IEEE Sep. 11, 2005; pp. 1641-1645, XP010926492.
Rubenstein et al., "Improving Reliable Multicast Using Active Parity Encoding Services"; (APES), 1999, IEEEE, pp. 1248-1255.
Office Action for EP 06 850 128.7 dated Dec. 16, 2010.
U.S. Official Action dated Dec. 21, 2009 in U.S. Appl. No. 11/428,336.
U.S. Official Action dated Jan. 6, 2010 in U.S. Appl. No. 11/691,565.
U.S. Official Action dated Jan. 22, 2010 in U.S. Appl. No. 11/164,119.
U.S. Official Action dated Jan. 24, 2011 in U.S. Appl. No. 11/829,274.
Canadian Office Action dated Dec. 30, 2010, Application No. 2,657,178.
Canadian Office Action dated Jan. 6, 2011, Application No. 2,657,174.
U.S. Official Action dated Jan. 29, 2010 in U.S. Appl. No. 11/692,457.
U.S. Official Action dated Feb. 19, 2010 in U.S. Appl. No. 11/164,147.
U.S. Official Action dated Feb. 26, 2010 in U.S. Appl. No. 11/482,438.
International Preliminary Report dated Feb. 2, 2010, PCT/US2008/070851.
International Preliminary Report dated Feb. 2, 2010, PCT/US2008/070853.
Canadian Office Action dated Feb. 8, 2010, Application No. 2,663,907.
U.S. Official Action dated Mar. 2, 2011 in U.S. Appl. No. 11/428,336.
Chinese Decision on Rejection, dated Jan. 26, 2011, Application No. 200780038707.X.
Canadian Office Action dated Feb. 21, 2011, Application No. 2,663,704.
U.S. Official Action dated Mar. 19, 2010 in U.S. Appl. No. 11/550,441.
U.S. Official Action dated Mar. 24, 2010 in U.S. Appl. No. 11/829,255.
U.S. Official Action dated Mar. 25, 2010 in U.S. Appl. No. 11/829,274.
U.S. Official Action dated May 10, 2010 in U.S. Appl. No. 11/164,115.
U.S. Official Action dated Jun. 3, 2010 in U.S. Appl. No. 11/428,336.
U.S. Official Action dated Jun. 7, 2010 in U.S. Appl. No. 11/482,439.
Office Action for EP 07 844 052.6 dated May 18, 2010.
U.S. Official Action dated Jul. 22, 2010 in U.S. Appl. No. 11/692,457.
Office Action for EP 07 812 635.6 dated Apr. 19, 2010.
Chinese Patent Application, CN 1509027A, Jun. 30, 2004.
U.S. Official Action dated Sep. 1, 2010 in U.S. Appl. No. 11/829,255.
Office Action for EP 06 850 128.7 dated Apr. 22, 2010.
Canadian Office Action dated Jul. 30, 2010, Application No. 2,629,310.
Chinese Office Action dated Aug. 10, 2010, Application No. 200780038707.X.
U.S. Official Action dated Sep. 17, 2010 in U.S. Appl. No. 11/829,274.
U.S. Official Action dated Sep. 27, 2010 in U.S. Appl. No. 11/692,457.
Canadian Office Action dated Sep. 1, 2010, Application No. 2,629,320.
U.S. Official Action dated Oct. 15, 2010 in U.S. Appl. No. 11/428,336.
U.S. Official Action dated Nov. 1, 2010 in U.S. Appl. No. 11/164,119.
U.S. Official Action dated Nov. 19, 2010 in U.S. Appl. No. 11/691,565.
U.S. Official Action dated Aug. 10, 2011 in U.S. Appl. No. 11/428,336.
Canadian Office Action dated Jun. 28, 2011, Application No. 2,682,364.
Canadian Office Action dated Jun. 28, 2011, Application No. 2,663,704.
Office Action for EP 07 812 635.6 dated Feb. 7, 2011.
U.S. Official Action dated Apr. 13, 2011 in U.S. Appl. No. 11/692,457.
Canadian Office Action dated Feb. 15, 2011, Application No. 2,629,313.
U.S. Official Action dated Jun. 27, 2011 in U.S. Appl. No. 11/829,255.
U.S. Official Action dated Jul. 7, 2011 in U.S. Appl. No. 11/829,274.
Canadian Office Action dated Jul. 27, 2011, Application No. 2,629,320.
Office Action for EP 08 743 985.7 dated Sep. 30, 2011.
Canadian Office Action dated Oct. 6, 2011, Application No. 2,663,907.
Canadian Office Action dated Nov. 14, 2011, Application No. 2,657,174.

* cited by examiner

CHANNEL CHANGES BETWEEN SERVICES WITH DIFFERING BANDWIDTH IN A SWITCHED DIGITAL VIDEO SYSTEM

CROSS-REFERENCE TO RELATED PATENT APPLICATIONS

The present U.S. application is related to U.S. applications entitled "QUALITY OF SERVICE MANAGEMENT IN A SWITCHED DIGITAL VIDEO ENVIRONMENT" with Ser. No. 11/164,102, "ATOMIC CHANNEL CHANGES IN A SWITCHED DIGITAL VIDEO SYSTEM" with Ser. No. 11/164,102, and "BANDWIDTH MANAGEMENT IN EACH NETWORK DEVICE IN A SWITCHED DIGITAL VIDEO ENVIRONMENT" with Ser. No. 11/164,119, which are incorporated herein by reference, and have been filed concurrently with the present application.

FIELD OF THE INVENTION

This invention relates in general to broadband communications systems, and more particularly, to the use of a switched digital video system to change between services with differing bandwidths in a local home network.

BACKGROUND

A broadband communications system includes data sources, a broadcasting network, a headend unit, and edge devices. The data sources can be encoders and video sources that send data through an uplink to the broadcasting network. In the broadcasting network, three common types of signals received at the headend include off-air signals, satellite signals, and local origination signals. The satellite signals include any signal transmitted from an earth station to an orbiting satellite which are then retransmitted back down to earth. The signals are transmitted from earth to the orbiting satellite on a path referred to as the uplink. These signals are then received by a transponder on the satellite and are retransmitted from the transponder to a receiving earth station over a downlink. The transponder amplifies the incoming signal and changes its frequency for the downlink journey to avoid interference with uplink signals.

The headend (HE) or central office is where signals from multiple sources are received and are conditioned and prepared for transmission over an access network to subscribers. Once signals have been prepared for delivery, they are combined onto a medium to be sent over the access network to the customer premise devices. Conditioning may include conversion of analog to digital, digital bit-rate conversion, conversion from variable bit rate to constant or clamped bit rate, conversion of multiple-program transport streams to single-program transport streams or any other type of grooming or combination of these. The medium may include coaxial, twisted pair or other cable, optical fiber, or some form of wireless transmission. The preparation for transmission in edge devices may include generation of an RF carrier, modulation, conversion to optical, frequency division multiplexing, time division multiplexing, wavelength division multiplexing or any combination of these. Edge devices vary depending on the type of network, and include the headend output devices. These edge devices sometime overlap with or extend into an access network. The fiber access network can include an optical line terminal (OLT), an optical node terminal (ONT), and devices inside the home. Therefore, the OLT and ONT may be considered either an edge device or an access network device. However, the ONT may at times be considered a customer premises device. A hybrid fiber/coax (HFC) network typically uses modulator edge devices. An HFC access network can include RF to optical converters, optical to RF converters, optical and RF amplifiers, optical and RF combiners, splitters and taps. HFC customer premises devices include RF modems and set-top boxes. A digital subscriber line (DSL) network can include a digital subscriber line access multiplexer (DSLAM). DSL modems are usually located in customer premises. The OLTs, modulators, and DSLAMs, also known as edge devices, service numerous user homes, such as a neighborhood in a city. Customer premise devices can include modems, routers, personal computers, set-top boxes (STB), etc.

FIG. 1 illustrates a satellite broadcast network 100. At an uplink facility 110, program content is stored on video servers controlled by a broadcast automation system. Any analog content at a network operations center (NOC) 120 is compressed using encoders and then multiplexed with the content delivered from the video file servers. The NOC 120 is responsible for overall control and co-ordination of the uplink and the downlink sites. A headend (HE) 130 may include one or more server devices for providing broadband signals such as video, audio, and/or data signals. The headend 130 also has numerous decoders which preferably each have a mass storage device, such as a hard disk drive.

Broadband communications systems, such as satellite and cable television systems and DSL, are now capable of providing many services in addition to analog broadcast video, such as Video-on-Demand (VOD), personal video recording (PVR), HDTV, Interactive TV, Web TV, online gaming, tele-learning, video conferencing, voice services, and high speed data services. With an increase in the number of services offered, the demand for bandwidth has drastically increased. A switched digital video (SDV) system is a technique that delivers selected services only to homes where and when users are actively requesting service. The switched digital video technique would be performed in the SDV devices, which vary depending on the type of network. A common problem using the SDV technique occurs when devices in a user's home requesting services requiring more aggregate bandwidth than can be provided. The SDV devices can not currently track the bandwidth being requested, so an attempt is made to honor all requests. This results in oversubscribing and a loss of packets.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION

The embodiments of the invention can be understood in the context of a broadband communications system. Note, however, that the invention may be embodied in many different forms and should not be construed as limited to the embodiments set forth herein. For example, transmitted broadband signals may include at least one of video/audio, telephony, data, or Internet Protocol (IP) signals, to name but a few. All examples given herein, therefore, are intended to be non-limiting and are provided in order to help clarify the description of the invention.

A switched digital video system is a method of maximizing the number of services offered using a minimum of bandwidth. The switched digital video system allows chosen services from the HE 130 or central office to continually be sent to the subscriber premises, or the user's home, and other services to be switched in as requested by the user. For example, in a cable television system, a specified group of popular television channels is continually sent to every home in an access network subdivision regardless of what the user may want. When a user requests a channel not in this specified group, it is first checked to see if anyone else in the service group is watching the requested channel. If yes, then the requesting user is given access to the stream already carrying the requested channel. If not, the switch provides the requested stream to the required edge device and the system gives the requesting subscriber access to that stream. A switched digital video system can be used on many types of networks such as fiber, hybrid fiber/coax, and xDSL networks.

Figure 1:
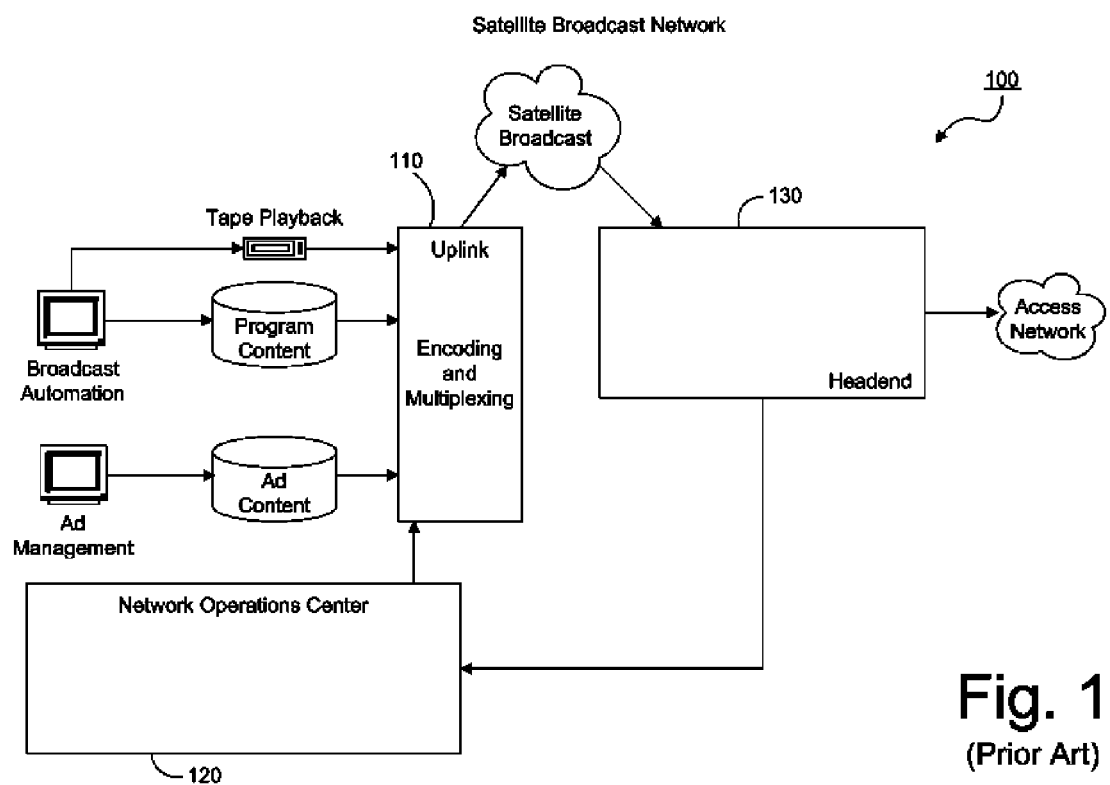
FIG. 1 illustrates a satellite broadcast system with an uplink, headend, and network operations center.
Figure 2:
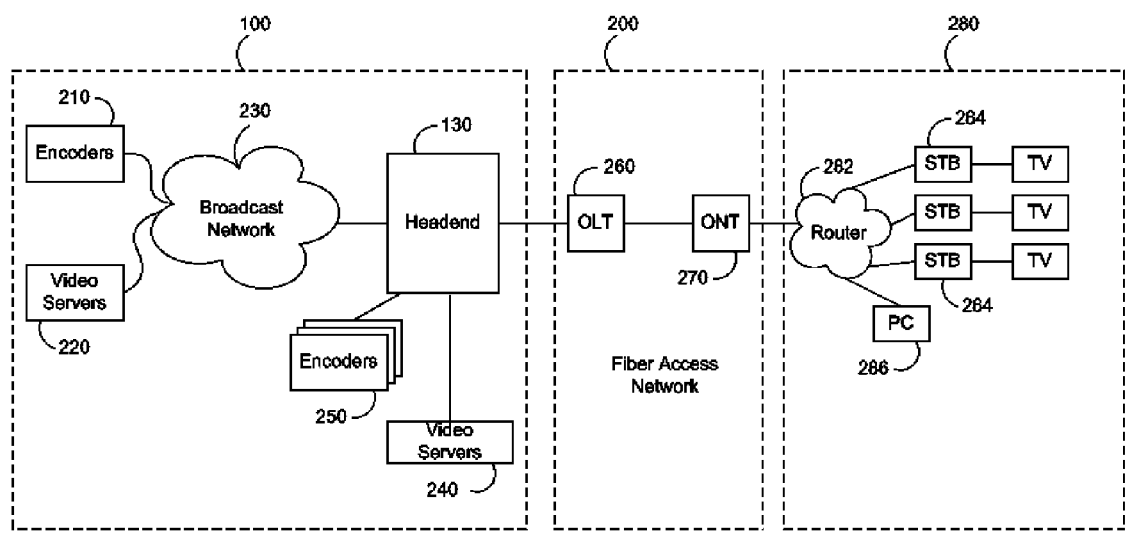
FIG. 2 illustrates the system of FIG. 1 in combination with a fiber access network and a customer premises network.

FIG. 2 illustrates the satellite broadcast system 100 of FIG. 1 in combination with a fiber access network 200 and a customer premises network 280. Encoders 210 and video servers 220 are the data sources that feed a broadcast network 230 of the satellite broadcast system 100. Video servers 240 and encoders 250 located at the HE 130 are used to insert local programming. The HE 130 of the satellite broadcast system 100 receives signals from multiple sources, conditions them and prepares them for transmission over the access network 200. Once signals have been prepared for transmission from the HE 130, they are combined onto the access network media. In a fiber access network 200 an optical line terminal (OLT) 260 transmits downstream to optical network terminals (ONT) 270 which are located outside the customer premises network 280. The OLT 260 is responsible for allocating necessary upstream bandwidths to the ONTs 270 by issuing data grants in an appropriate manner. Inside the customer premises network 280, the signals can be split and combined using a router 282, or other device, and then fed to various devices, such as one or more set-top boxes (STBs) 284 or personal computers (PCs) 286.

Figure 3:
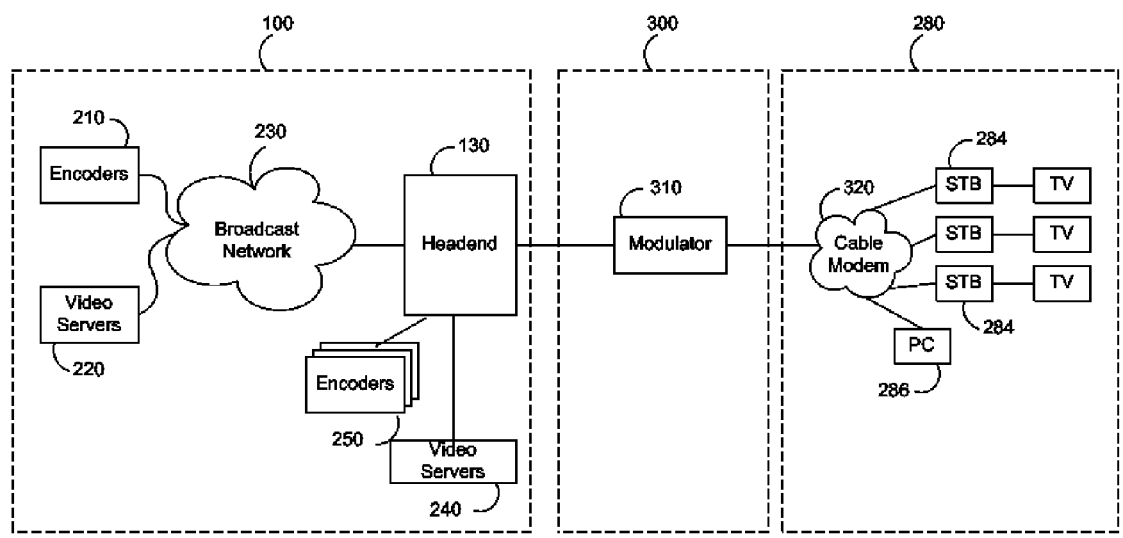
FIG. 3 illustrates the system of FIG. 1 in combination with a hybrid fiber/coax access network and a customer premises network.

FIG. 3 illustrates the satellite broadcast system 100 of FIG. 1 in combination with a hybrid fiber/coax (HFC) access network 300 and the customer premises network 280. The components used for the HFC access network 300 are similar to those used for the fiber access network 200. However, instead of the OLT 260 and the ONT 270, the hybrid fiber/coax network 300 uses an edge modulator 310. Inside the customer premises network 280, the signal is received by a cable modem 320 and sent to various devices, such as one or more STBs 284 or PCs 286. RF STBs may interface to the HFC access network 300 directly using internal modems.

Figure 4:
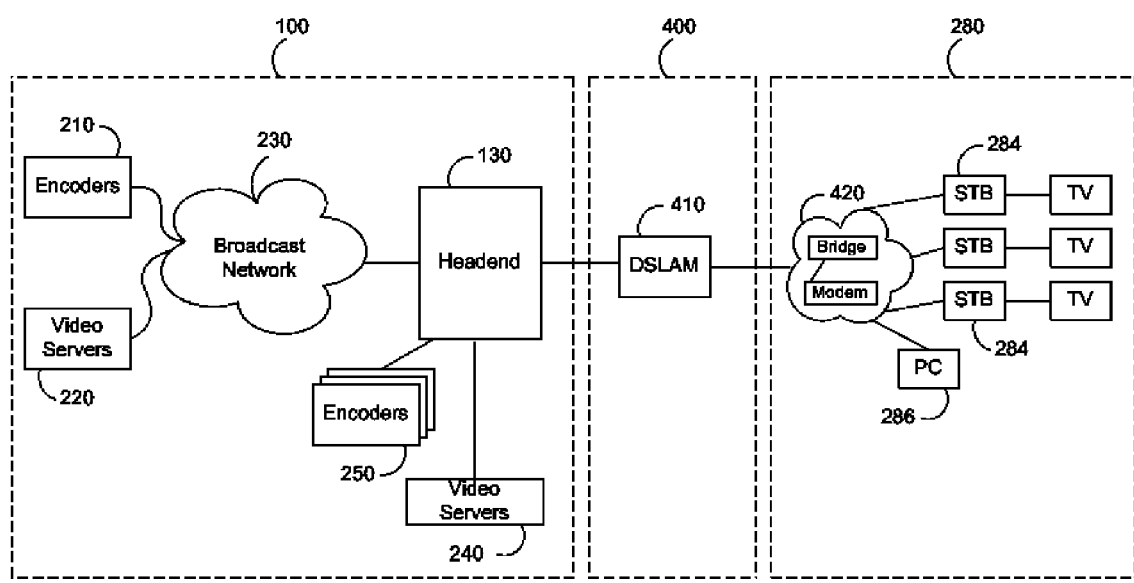
FIG. 4 illustrates the system of FIG. 1 in combination with a DSL access network and a customer premises network.

FIG. 4 illustrates the satellite broadcast system 100 of FIG. 1 in combination with a DSL access network 400 and the customer premises network 280. The components used for the DSL access network 400 are similar to those used in the fiber access network 200 and the HFC access network 300 except for the edge devices. Instead of the OLT 260 and the ONT 270 or the modulator 310, the DSL access network 400 has a digital subscriber line access multiplexer (DSLAM) 410 that links numerous users to a single high-speed ATM line. Inside the customer premises network 280, the signal is received by a local network 420 possibly containing a modem and bridge router. The signal is split there and fed to various devices, such as one or more STBs 284 or PCs 286.

The switched digital video technique would be performed in SDV devices, such as the OLT 260, DSLAM 440, modulator 340 or a router feeding the modulator 340, depending on the type of network. A common problem using the SDV technique occurs when devices in a user's home request services requiring more aggregate bandwidth than can be provided. The SDV devices can not currently track the bandwidth being requested, so an attempt is made to honor all requests. This results in oversubscribing and a loss of packets.

Figure 5:
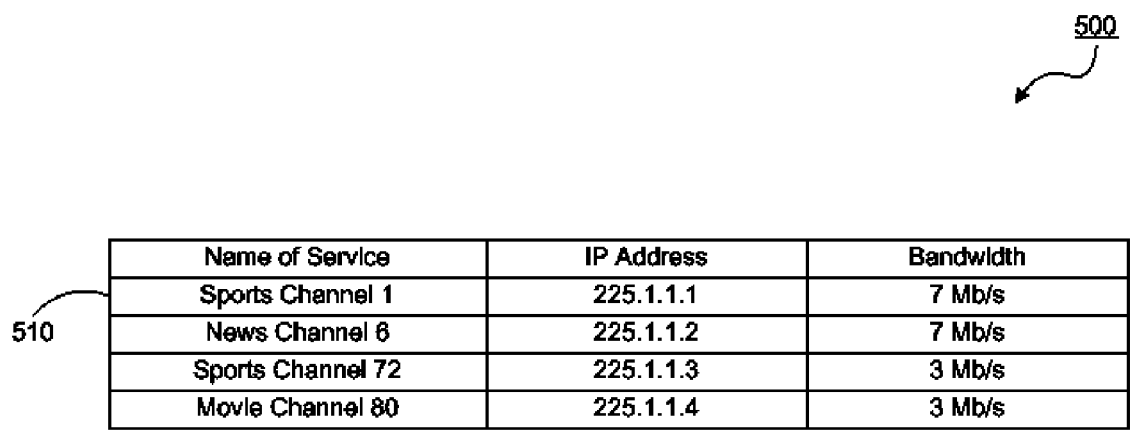
FIG. 5 illustrates a services map published by the headend.
Figure 6:
FIG. 6 illustrates a group of STBs and PCs in a home.

When a device in the user's home requests a change in service that will affect the bandwidth required, the change will be subject to a system resource management validation. For SDV devices to evaluate bandwidth requests and availability, the HE 130 can publish a services map 500, as shown in FIG. 5, prepared by the system operator. The map will be put in a multicast group, which is a group of different services, and the STB in the home will know to join the multicast containing the services map first. The STB will then distribute the map to the other devices in the home. As shown in FIG. 6, each SDV device and each device in the home will have an identifier, such as an IP address, which will allow them to differentiate themselves from one another. The devices in the home will use the information in the services map to provide the SDV devices with the requesting IP address and the required bandwidth. For example, STB number 1 with reference number 610 is located at IP address 192.168.0.1 and is tuned to the service "Sports Channel 1" shown as reference number 510 at IP address 225.1.1.1 requiring 7 Mb/s of bandwidth. The SDV devices have the ability to evaluate the request from the devices in the home by comparing the requested bandwidth to the available bandwidth for the subscriber premises. The SDV devices can either grant or deny the service in order to prevent oversubscription and a loss of packets.

In another embodiment, the SDV devices and all the devices in the users' home can correlate a request for service to the bandwidth available to each home. A bandwidth management status is the required bandwidth of a request correlated to the available bandwidth in the home. Each device has its own upper limit or choke point. The SDV devices and the home devices parse the service request packets before sending them upstream and adding their bandwidth management status (the requested bandwidth correlated to the available bandwidth) to the request. If any device does not have adequate bandwidth, it sends a message to the requesting device indicating an error condition.

Internet group management protocol (IGMP) is a standard used to communicate between an IP host, such as the SDV devices, and the neighborhood multicast agents to support allocation of temporary group addresses and the addition and deletion of members of the group. In this embodiment, the bandwidth can be managed by having a field in the IGMP request for adding the bandwidth management status at each intervening point, or at each device. In normal IGMP, only the IGMP endpoint is an active component. In this embodiment, however, the IGMP endpoint, the SDV device, and any of the devices in the user's home can read and evaluate the incoming requests in order to deny or pass on the request upstream.

Figure 7:
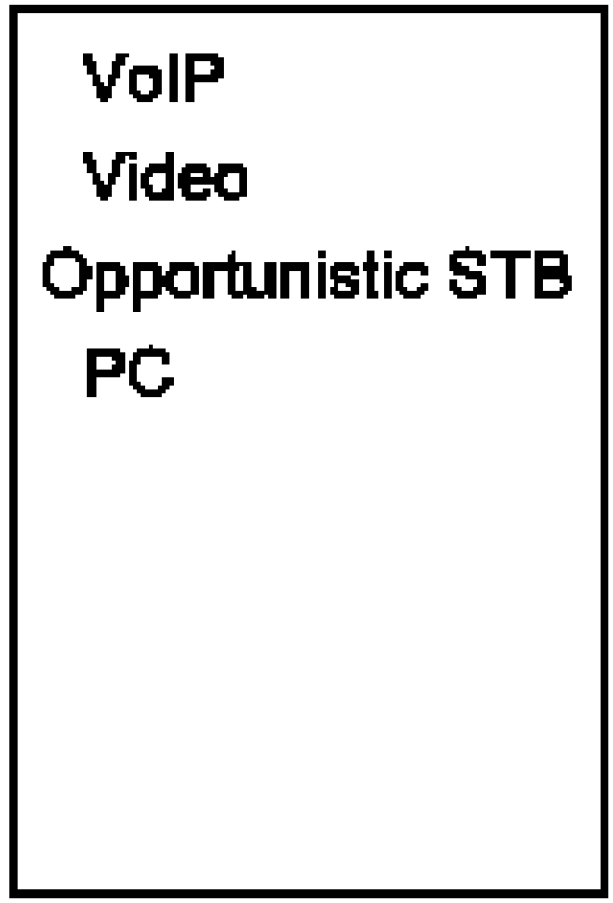
FIG. 7 illustrates a quality of service priority table for services in a user's home.

In the event of oversubscription, it is possible to place a quality of service (QOS) priority status on each request. This QOS priority status scheme is set up by the system operator. As the IGMP request passes from device to device, each device needs to be able to specify the required QOS for the requested stream. For example as shown in FIG. 7, in a multicast group, voice over IP (VoIP) streams may require a higher priority than video which has a higher priority than web surfing, which is an opportunistic STB function.

Figure 8:
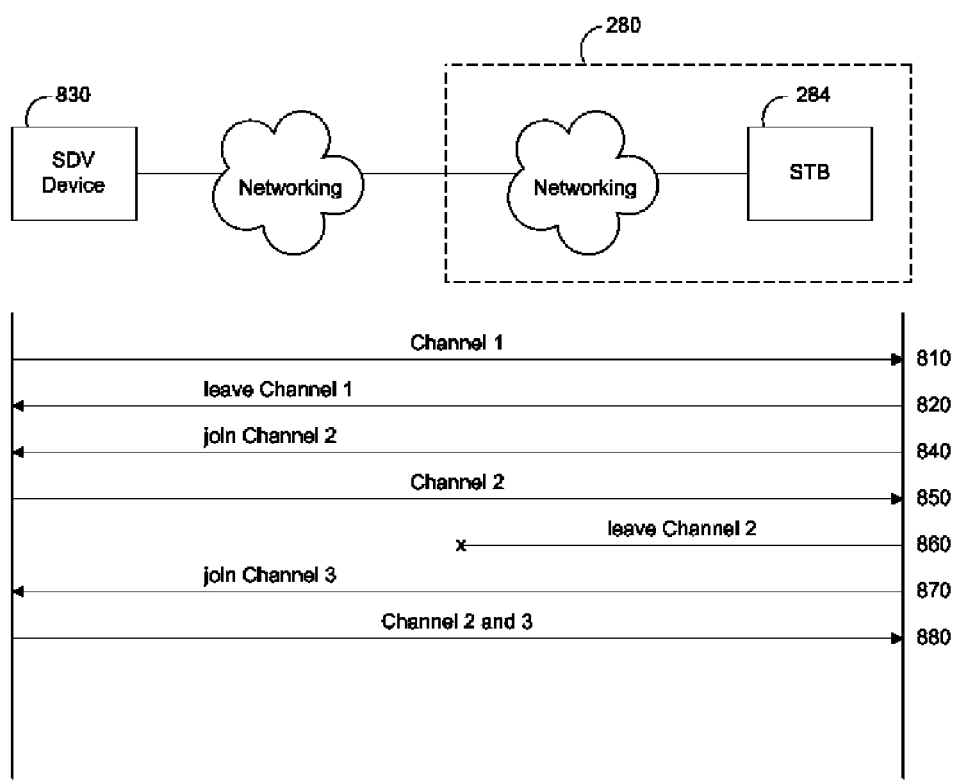
FIG. 8 illustrates the prior art method of IGMP based channel changes in a broadcast system, including an error condition.

FIG. 8 illustrates the current method of IGMP based channel changes in a broadcast system. Joining and leaving multicast groups are currently two independent transactions. The joining message is a request for a new channel and the leaving message is a request to terminate a current channel. For example, if a user is currently watching channel 1, as shown in reference number 810, and wants to watch channel 2, then a channel change must occur. First, a "leave channel 1" transaction 820 is sent to a SDV device 830. Then, a "join channel 2" transaction 840 is also sent to the SDV device 830. Channel 2, shown in reference number 850, is now being sent to a STB 284 in the user's home 280. This is a correct channel change.

Either of these transactions can be dropped by the network. A dropped transaction can lead to oversubscription. For example, if a user wants to change channels from channel 2 to channel 3, a "leave channel 2" transaction 860 is sent to the SDV device 830. If the transaction 860 is dropped, then channel 2 is still being sent to the STB 284. A "join channel 3" transaction 870 is also sent to the SDV device 830. The SDV device 830 will attempt to send both channels 2 and 3, as shown in reference number 880, which will cause an oversubscription.

Figure 9:
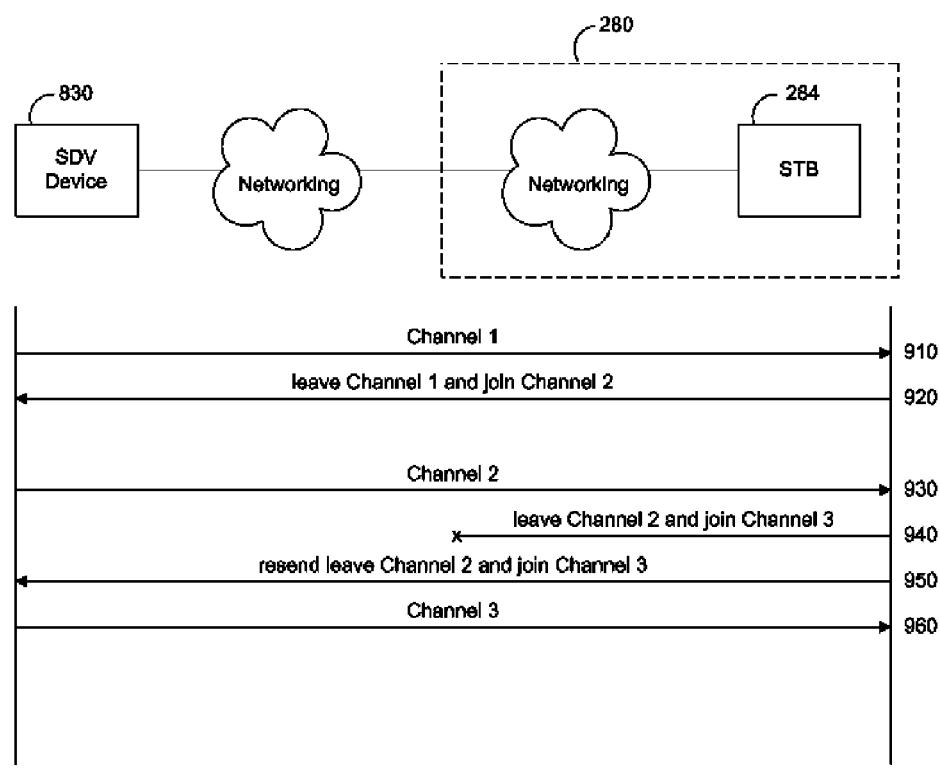
FIG. 9 illustrates a method of atomic channel change in a broadcast system according to the present invention.

FIG. 9 illustrates a method of atomic channel change in a broadcast system according to the present invention. In this embodiment, a new IGMP message is defined that explicitly lists the streams that the STB 284 wants to receive and simultaneously requests a join and leave transaction. For example, if a user is currently watching channel 1, shown in reference number 910, and decides to watch channel 2, then a channel change must occur. The STB 284 sends a message to the SDV device 830 that contains a "leave channel 1 and join channel 2" transaction 920. Channel 2, shown in reference number 930, is now being sent to the STB 284 in the user's home 280. This is a correct channel change. Also, if a user wants to change channels from channel 2 to channel 3, a "leave channel 2 and join channel 3" transaction 940 is sent to the SDV device 830. If the transaction 940 is dropped, then no change occurs and, because STB 284 never received channel 3, the STB 284 resends the "leave channel 2 and join channel 3" in transaction 950. The STB 284 may wait to receive channel 3 for a specified period of time before resending the "leave channel 2 and join channel 3" transaction 950. Alternately, if the user reiterates the channel change request, the STB 284 may resend the "leave channel 2 and join channel 3" transaction 950. The SDV device 830 is now sending channel 3, as shown in reference number 960, to the STB 284.

IGMP messages, such as join and leave messages, can be updated or modified to include bandwidth requirements of both the join and leave channels. For example, channel 1, as shown in reference number 910, may require a bandwidth of 3 Mb/s and channel 2, as shown in reference number 930, may require a bandwidth of 6 Mb/s. The SDV device can compare the available bandwidth in the local network to the required bandwidth for channel 2 before performing the channel change. This would allow the SDV devices to more accurately determine which services can be sent to a user's home without oversubscription occurring and return an error message to the requesting device if service is not possible.

The numerous services offered by broadband communications systems continue to grow. With an increase in the number of services offered and the number of users subscribing, the demand for bandwidth has drastically increased. The SDV technique, described above, delivers selected services only to homes where and when users are actively requesting service, which helps to efficiently manage the available bandwidth. To make this more effective, each device in the local network can calculate the bandwidth available to the local network versus the bandwidth requested for a service. By sending an error message back to the requesting device or some other device if the service cannot be provided, there is no loss of packets or disrupted service.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the embodiments of the invention in logic embodied in hardware and/or software-configured mediums.

What is claimed is:

1. A method implemented in a device located at a customer premise, the method comprising:
   receiving a service map from a headend containing a plurality of entries, each entry including a service identifier, a location from which the service can be received from, a quality of service priority status and a corresponding bandwidth requirement, wherein the quality of service priority status is associated with a predetermined quality of service priority status scheme;
   receiving a request for a service;
   determining, based on the service map, required bandwidth for the requested service, wherein determining the require bandwidth comprises:
      parsing the request for service of each device at the customer premise requesting service, and
      adding a bandwidth management status of each device together; and
   providing the required bandwidth and the requested service to a bandwidth allocation device, wherein the required bandwidth and the requested service are conveyed using an Internet group management protocol (IGMP) request, wherein each device at the customer premise is configured to read and evaluate the request in determining the required bandwidth.

2. The method of claim 1, wherein receiving the service map comprises: receiving the service map through a multicast group.

3. The method of claim 1, wherein receiving the request for the requested service comprises: receiving a user selection for a channel associated with the requested service.

4. The method of claim 1, wherein the bandwidth allocation device is associated with the requested service.

5. The method of claim 1, wherein the bandwidth allocation device allocates bandwidth for the requested service.

6. The method of claim 1, further comprising:
distributing the service map to a collocated customer premise device.

7. The method of claim 1, wherein each entry further includes an identifier of a switched digital video (SDV) device associated with the corresponding service.

8. The method of claim 1, wherein each entry further includes an identifier of a switched digital video (SDV) device providing the corresponding service.

9. A computing device comprising:
a processor executing instructions retrieved from a memory, the instructions comprising:
logic configured to receive a service map containing a plurality of entries, each entry including a service identifier, a location from which the service can be received from, a quality of service priority status and a corresponding bandwidth requirement, wherein the quality of service priority status is associated with a predetermined quality of service priority status scheme;
logic configured to receive a request for a service;
logic configured to determine, based on the service map, required bandwidth for the requested service, wherein determining the require bandwidth comprises:
parsing the request for service of each device at the customer premise requesting service, and
adding a bandwidth management status of each device together; and
logic configured to transmit a request for the requested service to a bandwidth allocation device, the request for the requested service including the required bandwidth, wherein the required bandwidth and the requested service are conveyed using an Internet group management protocol (IGMP) request,
wherein each device at the customer premise is configured to read and evaluate the request in determining the required bandwidth.

10. The computing device of claim 9, wherein the bandwidth allocation device is associated with the requested service.

11. The computing device of claim 9, wherein the bandwidth allocation device performs bandwidth allocation for the requested service.

12. The computing device of claim 9, wherein each entry further includes an identifier of a switched digital video (SDV) device associated with the corresponding service.

13. The computing device of claim 9, wherein each entry further includes an identifier of a switched digital video (SDV) device providing the corresponding service.

14. The computing device of claim 9, further comprising a receiver configured to receive media streams, and wherein the instructions further comprise:

logic configured to receive a response to the request; and
logic configured to instruct the receiver to receive the requested service, responsive to the received response being indicative of a grant of the request.

15. The computing device of claim 9, wherein the computing device is a set-top box.

16. A method implemented in a switched digital video (SDV) device, the method comprising:
transmitting a service map to a plurality of devices located in a customer premise, the service map containing a plurality of entries, each entry including a service identifier, a location from which the service can be received from, a quality of service priority status and a corresponding bandwidth requirement, wherein the quality of service priority status is associated with a predetermined quality of service priority status scheme;
receiving service requests from at least a portion of the plurality of devices, each service request including one of the services from the transmitted service map and the corresponding bandwidth requirement from the service map, wherein the received service requests are conveyed using Internet group management protocol (IGMP) requests, wherein each of the plurality of devices in the customer premise is configured to read and evaluate the received service request in determining the required bandwidth;
evaluating each of the received service requests by comparing the required bandwidth in the service request to available bandwidth for the customer premise, wherein comparing the required bandwidth in the service request comprises determining, based on the service map, required bandwidth for the requested service, wherein determining the require bandwidth comprises:
parsing the request for service of each of the plurality of devices located in the customer premise requesting service, and
adding a bandwidth management status of each device together; and
granting or denying each of the received service requests based on the respective evaluation, wherein each of the plurality of devices in the customer premise can grant or deny each of the received service requests.

17. The method of claim 16, further comprising:
tracking the available bandwidth for the customer premise based on granted service requests.

18. The method of claim 16, wherein the SDV device is one of a digital subscriber line access multiplexer (DSLAM), a digital content manager (DCM), or an optical line terminal (OLT).

* * * * *